United States Patent [19]

Machida et al.

[11] Patent Number: 5,547,654
[45] Date of Patent: Aug. 20, 1996

[54] SELF-ADHESIVE CARBONACEOUS GRAINS AND HIGH DENSITY CARBON ARTIFACTS DERIVED THEREFROM

[75] Inventors: Isao Machida, Fukuoka; Ryuji Fujiura, Tsukuba; Takashi Kojima, Tsukuba; Hitoshi Sakamoto, Tsukuba, all of Japan

[73] Assignee: Mitsubishi Gas Chemical Co., Ltd., Tokyo, Japan

[21] Appl. No.: 301,038

[22] Filed: Sep. 6, 1994

Related U.S. Application Data

[63] Continuation of Ser. No. 63,421, May 19, 1993, abandoned.

[30] Foreign Application Priority Data

Jun. 19, 1992 [JP] Japan ................ 4-161182
Jun. 19, 1992 [JP] Japan ................ 4-161183

[51] Int. Cl.$^6$ ........................................... C01B 31/02
[52] U.S. Cl. .................. 423/445 R; 423/448; 264/29.1; 208/44
[58] Field of Search .............. 208/22, 44; 423/445 R, 423/447.2, 448; 264/29.1, 29.3

[56] References Cited

U.S. PATENT DOCUMENTS

| | | | |
|---|---|---|---|
| 3,956,436 | 5/1976 | Honda et al. ............... | 264/29 |
| 4,293,533 | 10/1981 | Asano et al. ............... | 423/445 |
| 4,637,906 | 1/1987 | Fukuda et al. ............. | 264/29.1 |
| 4,891,126 | 1/1990 | Mochida et al. ........... | 208/39 |

FOREIGN PATENT DOCUMENTS

| | | |
|---|---|---|
| 0200965 | 12/1986 | European Pat. Off. . |
| 0318843 | 6/1989 | European Pat. Off. . |
| 0430689 | 6/1991 | European Pat. Off. . |
| 60-253646 | 6/1985 | Japan . |
| 1324124 | 7/1973 | United Kingdom . |

*Primary Examiner*—Michael Lewis
*Assistant Examiner*—Stuart L. Hendrickson
*Attorney, Agent, or Firm*—Wenderoth, Lind & Ponack

[57] ABSTRACT

Self-adhesive carbonaceous grains for use in the production of high density carbon artifacts and high performance carbon-carbon composites are made by processes such as oxidation and heat treatment of specific mesophase pitches. The present carbonaceous grains exhibit excellent binding properties, shape stability when molded, and high density with higher carbonization yield, providing very high strength artifacts when their properties fall within the specific range of properties defined by their H/C and O/C values. High density carbon artifacts can be easily obtained by molding the grains and carbonizing or graphitizing the same.

8 Claims, 1 Drawing Sheet

5,547,654

SELF-ADHESIVE CARBONACEOUS GRAINS AND HIGH DENSITY CARBON ARTIFACTS DERIVED THEREFROM

This application is a continuation of now abandoned application, Ser. No. 08/063,421, filed May 19, 1993.

BACKGROUND OF THE INVENTION

1. Field of the Invention

The present invention relates to self-adhesive carbonaceous grains and high density carbon artifacts derived therefrom. More specifically, the present invention relates to self-adhesive carbonaceous grains which are suitable as a starting material for the production of high density carbon artifacts and a binding substance for high performance carbon-carbon composites. The present invention and relates also to high density carbon artifacts produced from such carbonaceous grains.

2. Description of Related Art

High density carbon artifacts have been widely applied in various fields because of their excellent properties. They are now recognized to be indispensable for the most advanced technologies.

So far, many studies of the production of high density carbon artifacts have been made. The processes for preparing carbon artifacts are typically classified into two categories.

Procedures in the first category use filler coke and binder pitch as starting materials. Natural graphite and carbon black can be also used as filler. Pulverized coke may be used as a filler when blended with coal-tar or pitch as a binder. The process consists of molding of the mixture, repeated carbonization (baking) followed by impregnations for densification, and graphitization into the final product. In this method, there are several shortcomings. Since the carbonization yield of the binder is very low, cumbersome secondary treatments involving multiple impregnation and carbonization of the binder for densification is necessary. Further, an extremely slow heating of 2°–10° C./h is required during the carbonization process since the rapid evaporation of volatile matters causes expansion of or void formation in the product. Therefore 3–4 weeks are required to complete the carbonization process.

The carbonized product may be graphitized by further heating to a temperature in the range of 2500°–3000° C., depending upon the use of the final product and upon the specific performance required of it. Generally this process also requires a long period of 2–3 weeks to complete. Therefore, a considerably longer process time is necessary to produce high density carbon artifacts through the conventional, complicated method of using a filler and a binder.

The second process consists of preparation of self-adhesive carbonaceous grains, molding them without any additional binding substances, carbonization and graphitization. The absence of the impregnation step is a characteristic of this process. Mesocarbon microbeads have also been developed as a starting material for binderless molding, as described in GBP 1,324,124 and U.S. Pat. No. 3,956,236.

Mesocarbon microbeads are prepared through a heat treatment at 350°–500° C. of coat-tar or petroleum based pitch, solvent-extraction, filtration from the matrix, drying, and classification. High density isotropic carbon artifacts can be obtained by molding such mesocarbon microbeads under pressure and subsequently calcining them. However, there are a few problems to be solved in connection with this method.

This process entails the use of a large quantity of solvent duing the extraction and filtration steps. In addition, it is very difficult to completely remove remaining solvent from mesocarbon microbeads obtained in this way. This means that cracking or expansion of the product is apt to result during the carbonization. Furthermore, in addition to the problem of low extraction yield in this process, it is also difficult to properly control the properties of the mesocarbon microbeads.

As described above, both conventional processes for producing high density carbon artifacts are very disadvantageous from the viewpoint of productivity and economy. These fabrication processes for high density carbon artifacts are extremely complicated and the final products prepared by such conventional methods are very expensive. As a result, their broad application is greatly restricted at this stage.

SUMMARY OF THE INVENTION

An object of the present invention is to provide (a) self-adhesive carbonaceous grains which provide high density and high strength carbon artifacts that are easily producible in a short time and at low cost, (b) high density carbon artifacts which are derived from the self-adhesive carbonaceous grains described in (a).

In order to attain the above-stated object, the present inventors have made an elaborate investigation of the properties of mesophase pitches. As a result, the following was found: when a specific mesophase pitch was modified by oxidation or heat treatment into mesophase carbonaceous grains in which such specific properties as H/C value (the ratio of hydrogen atoms to carbon atoms) and an O/C value (the ratio of oxgen atoms to carbon atoms) were required to be within a certain range, the grains exhibited higher carbon yield maintaining a high level of self-adhesive ability, and high density and high strength carbon artifacts could be obtained very simply at low cost without any additional binder. The present invention has been accomplished on the basis of these findings.

The present invention relates basically to new self-adhesive carbonaceous grains and a process for producing high density carbon artifacts derived from such grains. In one aspect of the invention, it relates to the self-adhesive carbonaceous grains having a H/C atomic ratio within a range of from 0.48 to 0.59 and an O/C atomic ratio within a range of from 0.01 to 0.10. These grains are produced by an oxidation treatment of a specific mesophase pitch which has a carbon yield of at least 70% by weight, a softening point of higher than 170° C. and exhibits optical anisotropy of at least 70%.

In another aspect of the present invention, it relates to the self-adhesive carbonaceous grains having a H/C atomic ratio within a range of from 0.35 to 0.48 and an O/C atomic ratio of less than 0.01. These grains are produced by heat treatment of the same specific mesophase pitch described above.

The present invention relates also to high density carbon artifacts easily derived from such self-adhesive carbonaceous grains.

BRIEF DESCRIPTION OF THE INVENTION

FIG. 1 is a graph showing weight gains in the oxidation of two kinds of grains at 220° C. in air flow as an example of the different reactivity of mesophase pitches to oxygen.

DETAILED DESCRIPTION OF THE INVENTION

Figure 1:
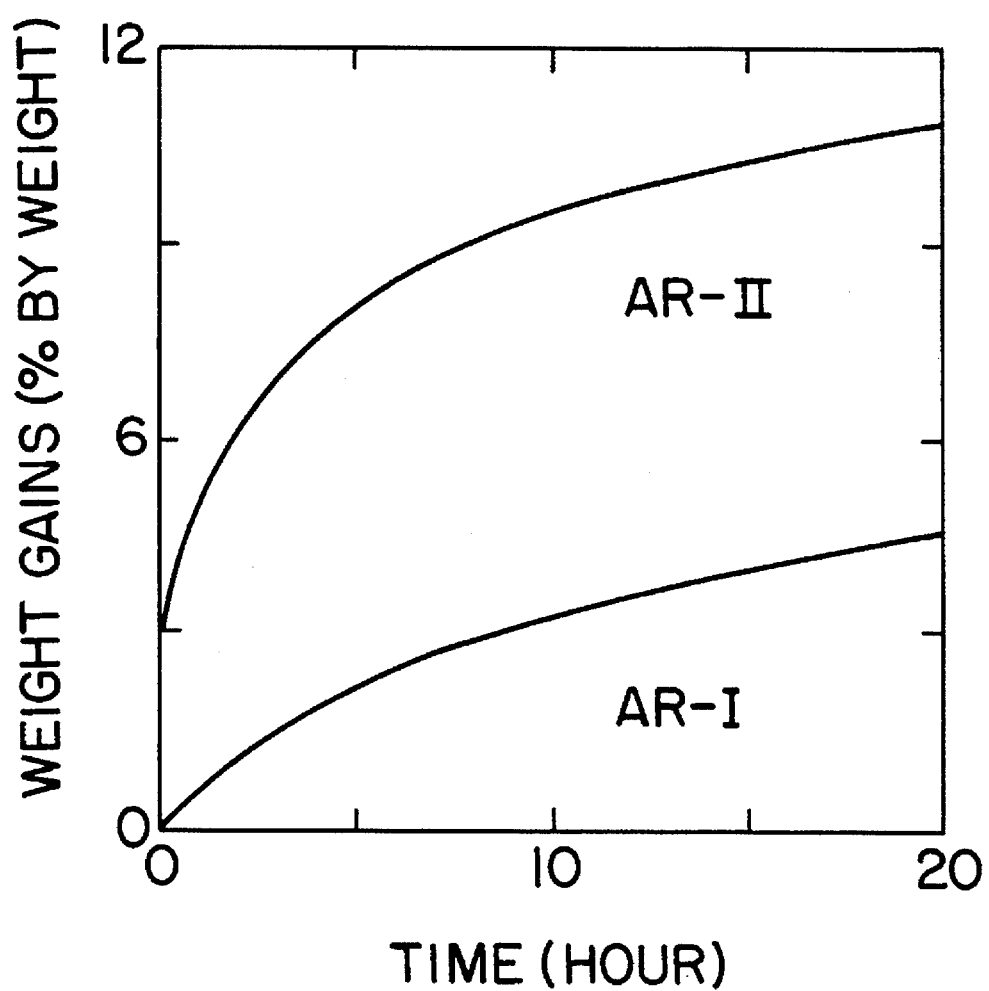

The carbon, hydrogen and oxygen contents of the self-adhesive carbonaceous grains are determined by an automatic analyzer using detection methods based on the heat conductivity of combustion gas.

The mesophase pitch to be used in the present invention has a carbon yield of at least 70% by weight, and preferably at least 80% by weight, when it is gradually heated to a temperature of 600° C. in an inert gas flow and thereafter maintained for 2 hours at that temperature. The use of this mesophase pitch having a high carbon yield contributes to less evaporation of volatile matters during the carbonization. As a result, a dense and homogeneous carbon artifact can be obtained. On the other hand, if the mesophase pitch has a low carbon yield, voids are more likely to form in the molded product during the carbonization because of the generation of gases, and a decrease in density of the carbon artifact results in many cases. The use of mesophase pitch having a higher carbonization yield is essential for the production of high performance carbon artifacts.

The mesophase pitch of the present invention has a softening point of higher than 170° C. This softening point is measured by a flow tester.

The mesophase pitch of the present invention contains at least 70%, preferably at least 80%, and more preferably almost 100%, of an optical anisotropic phase as determined by examination under a polarizing microscope.

Coal-tar or petroleum based mesophase pitch can be applied as a starting material in the present invention so long as they satisfy the aforementioned requirements. In particular, as described in U.S. Pat. No. 4,891,126, the mesophase pitch produced by polymerizing condensed polycyclic aromatic hydrocarbons in the presence of $HF/BF_3$ can be preferably used because of its higher carbon yield.

The self-adhesive carbonaceous grains in the present invention can be produced in the two different ways from the mesophase pitch mentioned above. In other words, they can be obtained through the oxidation or the heat treatment of the mesophase pitch.

First, the production process related to the oxidation treatment is explained. Mesophase pitch satisfying the above-stated requirements is pulverized into grains. There is no particular limitation on the method for pulverization or the shape of grains. The distribution of the particle size is not limited in any particular way. However, it is preferred that the particle size distribution be such that filling density is as high as possible at the molding step. Generally, the grains are oxidized at a particle size of 1–200 μm.

In the next step, the grains from the mesophase pitch are oxidized in an oxidizing atmosphere of air or oxygen flow. Taking into consideration that the oxidation conditions depend upon the properties of the mesophese pitch and its reactivity to oxygen, it is necessary to select appropriate oxidation conditions by which the values of H/C and O/C of the resultant grains fall within the defined ranges of from 0.48 to 0.59 and from 0.01 to 0.10, respectively. In other words, by preparing grains having such specified values of H/C and O/C, the great advantages such as excellent binding properties, shape stability of the molded articles made therefrom and higher carbonization yield can be easily obtained, and carbon products of high strength as well as high density can be obtained without inducing any cracks or expansions during the carbonization.

There is no particular limitation on oxidation conditions. Generally, an oxidation temperature in the range of 170°–350° C. is desirable in terms of industrial operation. When the temperature is higher than 350° C., controlling the amount of oxygen absorbed is difficult since the oxidation reaction proceeds very rapidly. Furthermore, an undesirable thermal degradation of the raw pitch may result. In contrast, when the temperature is lower than 170° C., industrial application is not practical because the oxidation reaction is extremely slow.

The weight gains in the oxidation of two kinds of the grains at 220° C. in air flow are shown in FIG. 1, as an example of the different reactivity of mesophase pitches to oxygen. The mesophase pitches (AR-I and AR-II) were derived from naphthalene in the presence of $HF/BF_3$. General properties of the mesophase pitches are summarized in Table 1. AR-I with its higher softening point of over 300° C. picks up oxygen slowly, achieving a 4.5%-weight gain after 20 hours. In contrast, AR-II with its lower softening point of 207° C. picks up oxygen rapidly at the early stage, achieving 11%-weight gain after 20 hours. Hence, even if the mesophase pitches have different reactivities to oxygen, they can be modified into excellent mesophase carbonaceous grains as useful starting material for production of the high density carbon artifacts by performing the oxidation to an appropriate extent and bringing the H/C and O/C of the grains within the proper range of values prescribed above and as shown in EXAMPLES 1 and 2.

TABLE 1

| | Properties of the mesophase pitches used in the oxidation treatment | | | |
|---|---|---|---|---|
| | S.P.[a] | A.C.[b] | H/C | C.Y.[c] |
| AR-1 | >300 | 100 | 0.51 | 91 |
| AR-II | 207 | 100 | 0.65 | 80 |

[a] Softening Point (°C.)
[b] Anisotropic Content (vol %)
[c] Carbon Yield (wt %)
carbonization conditions: 600° C., 2 hour, 300° C./h, in nitrogen If the oxidation treatment is excessive, the binding properties of the mesophase grains will deteriorate and their carbonization yield will decrease, causing a decrease of the density of the products as shown in COMPARATIVE EXAMPLE 1. On the other hand, if the oxidation treatment is insufficient, the expansion or bloating of the molded article will take place in the subsequent carbonization step on account of the generation of gases and, as shown in COMPARATIVE EXAMPLE 2, it will be impossible to obtain the desired high performance carbon artifacts. If the oxidation temperature is too high, the adhesion among the mesophase grains will occur partially or entirely, as shown in COMPARATIVE EXAMPLE 3, this may result in difficulty in handling.

In short, the adequate level oxidation where both the properties of mesophase pitches and their reactivities to oxygen are carefully considered can effectively result in products with the desired thermosetting properties, maintenance of a self-adhesive ability and higher carbon yield. Therefore high density isotropic carbon artifacts of high strength can be produced by a single calcination.

In the next step, the adequately oxidized mesophase grains are molded. There is no particular need to add a binding substance in this step. The shape of the molded carbonaceous materials is not limited in any particular way. It may be a disk, plate, cylinder, or any other shape depending upon the object, the use of the final product, or the performance required of it. The molding is performed at room temperature or under conditions such that the oxidized carbonaceous grains are softened or melted. This is determined according to the shape, the performance, or cost required to prepare it.

According to the present invention, the density of the final products can be controlled not only by the molding pressure but also by the oxidation conditions. In the conventional processes of the prior art, the density of the products has been controlled mainly by molding pressure. However, the application of the present method of combining the adjustment of oxidation conditions with the molding pressure makes it possible to adjust the density of the products to a great extent.

A desired carbon artifact can be produced by subsequently calcining the molded carbonaceous material. The calcining step is conducted by carbonizing the molded material at 600°–1600° C. in a non-oxidizing atmosphere. If desired, the carbonized product may be graphitized by further heating to a higher temperature.

Next, the production process based on the heat treatment of mesophase pitches is explained. The self-adhesive carbonaceous grains can also be prepared by heat treating the mesophase pitches and subsequently pulverizing them. The heat treatment condition is not limited in any particular way so long as the resultant carbonaceous grains have a specified H/C value within the range of from 0.35 to 0.48 and a specified O/C value of less than 0.01. Generally, the heat treatment of the mesophase pitch is conducted in a non-oxidizing atmosphere of inert gas at a temperature in the range of 470°–550° C. while stirring.

In the present invention, the heat treatment of the mesophase pitch to such an extent that the resultant carbonaceous grains possess a limited H/C value between 0.35 and 0.48 and a limited O/C value of less than 0.01 provide excellent self-adhesive ability and shape stability of their mold, exhibiting high density due to higher carbon yield without inducing any cracks or causing any expansion during the carbonization. In other words, through such an adequate heat treatment, a mesophase pitch can be modified into self-adhesive carbonaceous grains exhibiting high performance as a starting material for high density isotropic carbon artifacts since the excellent fusibility of the carbonaceous grains in the shaped material is assured at an earlier stage (400°–600° C.) of the carbonization as shown in EXAMPLEs 3 and 4.

Excessive heat treatment of the mesophase pitches decreases the binding properties of the resulting carbonaceous grains. As a result, a carbon artifact having the desired performance cannot be obtained as shown in COMPARATIVE EXAMPLE 4. On the other hand, insufficient heat treatment is liable to result in the expansion or bloating of the shaped material due to the generation of gases in the subsequent carbonization process, and, as shown in COMPARATIVE EXAMPLE 5, it is impossible to obtain the desired carbon artifact. In addition, an increase of oxygen content in the heat treated mesophase pitch should be avoided because a deterioration of the binding ability of the resultant carbonaceous grains as well as a decrease of their carbonization yields will result as shown in COMPARATIVE EXAMPLE 6.

In other words, such an appropriate heat treatment of the mesophase pitches in which both the H/C value and the O/C value of the resultant carbonaceous grains fall within the limited ranges prescribed above, that is, a H/C value between 0.35 and 0.48, and an O/C value of less than 0.01 provides higher carbon yields and a high level of self-adhesive properties and eliminates the generation of gases as much as possible during the carbonization. Therefore high density and high strength carbon artifacts can be produced by a single calcination.

In the next step, in order to obtain high density and high strength carbon artifacts, such heat treated mesophase pitch is pulverized into grains. There is no particular limit on the method for pulverization or the form of the grains. The particle size distribution is not restricted in any particular way. However, it is desirable to have such a particle size distribution that the filling density is as high as possible at the shaping step. Generally they are molded in the size of 1–200 μm.

After that, the grains derived from the heat treated mesophase pitch are molded. There is no particular need to add a binding substance in this step. The shape of the molded carbonaceous materials is not limited in any particular way. It should be determined depending upon the object, use of the final product, or the performance required of it. The molding is performed at room temperature or at under conditions such that the heat treated carbonaceous grains are softened or melted. This temperature is selected according to the shape, the performance, or costs of the final artifact.

A desired carbon artifact can be produced by subsequently calcining the molded carbonaceous material.

In the present invention, a specific mesophase pitch exhibiting a higher carbonization yield and good graphitizability is applied as a starting carbonaceous material. The mesophase pitch is subjected to an appropriate oxidation or heat treatment before molding to adjust the properties. The grains derived from such mesophase pitch effectively provide their improved properties for binderless molding, maintaining self-adhesion and higher carbon yield. Hence the production of carbon artifacts can be easily accomplished within a short time and sufficiently high density and strength of the artifacts can be attained by a single run of firing. In addition, since the textures derived from the mesophase pitch are optically anisotropic, very dense, and very pure, very strong carbon bonds are formed among grains by the carbonization. The strength of those carbon bonds is further increased by firing at a higher temperature because the extent of the graphitization is increased and the densification is further enhanced by the subsequent shrinkage.

The conventional techniques of using mesocarbon microbeads are not sufficient for the achievement of high density and strength since the binding property of mesophase spheres themselves is not so strong. Hence, Japanese Patent Publication No.2534/1985 disclosed an improved production process for high density carbon artifacts, where the surfaces of mesophase spheres are coated with β component (a benzene insoluble and a quinoline solble) of the pitch matrix in order to control their self-adhesion. Such treatment of the mesophase spheres adjusts the fusibilities of the binding components, that is, the β components at the temperature range of 400°–600° C. and promotes strong bonding among spheres, with the result that carbon artifacts having high density and strength can be obtained. However, this method of using the thus prepared spheres also belongs to a substantially dual material system because the β components, namely, the adhesive surface layer of the mesophase spheres, are considered to exhibit different contraction behavior from the mesophase spheres themselves through the progress of condensation of the reaction during the carbonization. For this reason, there may be a limit to the attainment of high density and strength.

Therefore, when a new technique of using a unitary material system which consists of substantially homogeneous and uniform components, as opposed to using traditional dual systems, can be developed, ideal high density and strength can be achieved. Since the self-adhesive carbonaceous grains in the present invention are characterized by a new single material system composed of substantially homogeneous constituents, they can assure adequate fusibility at an earlier carbonization stage of 400°–600° C., maintaining their shape stability. A high level of self-adhesive ability in the grain themself simultaneously increases the binding strength among the grains. Moreover, during the latter period of the carbonization, uniform volumetric contraction can be achieved. Hence, high density, strenth, and homogeneity of the artifact can be attained as well.

For the reasons described above, high performance carbon artifacts can be easily produced by simple procedures in a short time and at low cost. Therefore, the present invention offers great industrial benefits.

SPECIFIC EXAMPLES OF THE INVENTION

The invention will now be described specifically by the following examples that by no means limit the scope of the invention.

EXAMPLE 1

The mesophase pitch, AR-I, prepared by polymerizing naphthalene in the presence of a super acid consisting of $HF/BF_3$ was pulverized into grains having a grain size of less than 74 μm in diameter by a grinder. The mesophase pitch had a softening point of higher than 300° C., anisotropic content of 100% and a H/C of 0.51. It was possible to be carbonized in a yield of 91% by weight at 600° C.

Next, the grains were subjected to an oxidation treatment. They were heated to 220° C. at a rate of 300° C./h in air flow and held at that temperature for one hour. The H/C and O/C values of the oxidized grains were 0.49 and 0.021, respectively.

Those grains were molded into a plate under a pressure of 1200 kg/cm² at room temperature without adding a binder. The plate thus prepared was heated up to 600° C. at a rate of 60° C./h in nitrogen atmosphere and maintained at that temperature for 2 hours. Its carbon yield was 96% by weight. Subsequently, the plate was carbonized at 1300° C. for 2 hours in argon atmosphere, whereby a plate having a width of 50 mm, a length of 50 mm and a thickness of 10 mm was obtained. The carbonized plate was further heated to 1900° C. and maintained at that temperature for 2 hours in argon atmosphere.

The calcining temperature and the basic physical properties of the plate obtained in this Example are shown in the following Table 2.

EXAMPLE 2

The mesophase pitch AR-II derived from naphthalene using $HF/BF_3$ as a catalyst was pulverized into grains having a grain size of less than 74 μm by a grinder. The mesophase pitch, AR-II, had a softening point of 207° C., an anisotropic content of 100% and a H/C value of 0.65. It could be carbonized in a yield of 80% by weight at 600° C.

In the next step, these mesophase grains were subjected to oxidation in the following manner: they were heated to 220° C. at a rate of 300° C./h in air flow and maintained at that temperature for 2 hours. By this procedure oxidized grains having a H/C of 0.51 and an O/C of 0.076 were obtained.

The grains thus prepared were molded into a plate and thereafter calcined under the same conditions as in EXAMPLE 1. The carbon yield at 600° C. was 91% by weight. After that the plate was calcined at 1300° C. and 1900° C.

The calcination temperature and the basic physical properties of the plate obtained in this Example are shown in the following Table 2.

COMPARATIVE EXAMPLE 1

The same mesophase pitch as was used in EXAMPLE 2, that is, AR-II, was pulverized into grains using the same methods as in Example 1. The grains were heated to 220° C. at a rate of 300° C./h in air flow and maintained at that temperature for 22 hours to oxidize them. The H/C and O/C values of the oxidized grains were 0.41 and 0.154, respectively.

Subsequently such oxidized grains were molded and calcined under the same conditions as in EXAMPLE 1. The carbon yield at 600° C. was 79.9% by weight. After that the plate was further calcined at 1300° C. and 1900° C. under the same conditions as in EXAMPLE 1.

In this case, where both the H/C and O/C of the oxidized grains deviated from the above-mentioned ranges, a carbon artifact of high performance could not be obtained as shown in Table 2.

COMPARATIVE EXAMPLE 2

The same mesophase pitch as in EXAMPLE 2, that is, AR-II, was pulverized into grains using the same methods in Example 1. The grains were heated to 200° C. at a rate of 300° C./h in air flow and maintained at that temperature for 1 hour to be oxidized. The H/C and O/C values of the oxidized grains were 0.60 and 0.043, respectively.

The H/C of these oxidized grains deviated from the defined range, and when they were molded and calcined at 600° C. under the same conditions as in EXAMPLE 1, the expansion of the plate resulted.

COMPARATIVE EXAMPLE 3

The same mesophase pitch as in EXAMPLE 2, that is, AR-II, was pulverized into grains using the same methods in Example 1. The grains were heated to 270° C. at a rate of 300° C./h in air flow and maintained at that temperature for 1 hour to be oxidized. At that oxidation temperature, adhesion among grains was observed. This phenomenon was considered undesirable in an industrial operation. The H/C and O/C values of the oxidized grains were 0.48 and 0.12, respectively.

Subsequently such oxidized grains were molded and calcined under the same conditions as in EXAMPLE 1. In this case where the O/C of the oxidized grains deviated from the above-mentioned range, a carbon artifact of high performance could not be obtained as shown in Table 2.

TABLE 2

| | Calcining temperature (°C.) | Bulk density (g/cm³) | Compressive strength (kgf/mm²) | Flexural strength (kgf/mm²) |
| --- | --- | --- | --- | --- |
| EXAMPLE 1 | 600 | 1.33 | 15.9 | 7.4 |
| | 900 | 1.72 | 23.1 | 12.9 |
| | 1300 | 1.88 | 32.7 | 15.2 |
| | 1900 | 1.98 | 26.3 | 13.9 |

TABLE 2-continued

| | Calcining temperature (°C.) | Bulk density (g/cm³) | Compressive strength (kgf/mm²) | Flexural strength (kgf/mm²) |
| --- | --- | --- | --- | --- |
| EXAMPLE 2 | 600 | 1.32 | 14.8 | 6.9 |
| | 900 | 1.69 | 22.4 | 12.5 |
| | 1300 | 1.88 | 29.0 | 14.4 |
| | 1900 | 1.96 | 24.6 | 13.7 |
| COMPARATIVE EXAMPLE 1 | 600 | 1.26 | 9.5 | 4.2 |
| | 900 | 1.64 | 16.3 | 7.4 |
| | 1300 | 1.72 | 11.1 | 4.0 |
| | 1900 | 1.79 | 7.9 | 3.0 |
| COMPARATIVE EXAMPLE 2 | 600 | unmeasurable | unmeasurable | unmeasurable |
| | 900 | unmeasurable | unmeasurable | unmeasurable |
| | 1300 | unmeasurable | unmeasurable | unmeasurable |
| | 1900 | unmeasurable | unmeasurable | unmeasurable |
| COMPARATIVE EXAMPLE 3 | 600 | 1.23 | 8.7 | 3.9 |
| | 900 | 1.59 | 11.5 | 6.1 |
| | 1300 | 1.70 | 9.2 | 3.8 |
| | 1900 | 1.76 | 6.0 | 2.7 |

EXAMPLE 3

The mesophase pitch, AR-I, prepared by polymerizing naphthalene in the presence of a super acid consisting of $HF/BF_3$ had a softening point of higher than 300° C., anisotropic content of 100% and a carbon yield of 91% by weight at 600° C. This mesophase pitch was subjected to heat treatment in the following manner: it was heated to 480° C. at a rate of 300° C./h in nitrogen gas flow and maintained at that temperature for 30 minutes. The H/C and O/C values of the heat treated pitch were 0.47 and 0.006, respectively.

The pitch was pulverized into grains having a grain size of less than 74 μm and molded into a plate having a width of 50 mm, a length of 50 mm and a thickness of 10 mm under a pressure of 1200 kg/cm² at room temperature without adding a binder. The plate thus prepared was heated up to 600° C. at a rate of 60° C./h in nitrogen atmosphere and maintained at that temperature for 2 hours. Its carbon yield was 97% by weight.

Subsequently, the plate was carbonized at 1300° C. for 2 hours in argon atmosphere. The carbonized plate was further heated to 1900° C. and held at that temperature for 2 hours in argon atmosphere.

The calcining temperature and the basic physical properties of the plate obtained in this example are shown in the following Table 3.

EXAMPLE 4

The mesophase pitch, AR-III, prepared by polymerizing naphthalene in the presence of a super acid consisting of $HF/BF_3$ had a softening point of 220° C., anisotropic content of 100% and a carbon yield of 83% by weight at 600° C. The mesophase pitch was subjected to heat treatment in the following manner: it was heated to 505° C. at a rate of 300° C./h in nitrogen gas flow and maintained at that temperature for 2 hours. The H/C and O/C values of the heat treated pitch were 0.44 and 0.005, respectively.

The pitch thus heat treated was pulverized into grains having a grain size of less than 74 μm and molded into a plate having a width of 50 mm, a length of 50 mm and a thickness of 10 mm under a pressure of 1200 kg/cm² at room temperature without adding a binder. The plate thus prepared was heated up to 600° C. at a rate of 80° C./h in nitrogen atmosphere and maintained at that temperature for 2 hours. Its carbon yield was 97% by weight. subsequently, the plate was carbonized at 1300° C. for 2 hours in argon atmosphere. The carbonized plate was further heated to 1900° C. and maintained at that temperature for 2 hours in argon atmosphere.

The calcining temperature and the basic physical properties of the plate obtained in this example are shown in the following Table 3.

COMPARATIVE EXAMPLE 4

The same mesophase pitch as in EXAMPLE 4, that is, AR-III was subjected to heat treatment in the following manner: it was heated to 520° C. at a rate of 300° C./h in nitrogen flow and maintained at that temperature for 5 hours. The H/C and O/C values of the heat treated pitch were 0.34 and 0.005, respectively.

After pulverization to grains, the pitch was molded into a plate and calcined in the same way as in EXAMPLE 4.

The calcining temperature and the basic physical properties of the plate obtained in this Example are shown in the following Table 3. In this case where the grains from the heat treated pitch had too low a H/C, it was found that the self-adhesive abilities of the grains were partly lost.

COMPARATIVE EXAMPLE 5

The mesophase pitch, AR-IV, prepared by polymerizing naphthalene in the presence of a super acid consisting of $HF/BF_3$ had a softening point of 230° C., anisotropic content of 100% and a carbon yield of 85% by weight at 600° C. This mesophase pitch was subjected to a heat treatment in the following manner: it was heated to 400° C. at a rate of 300° C./h in nitrogen gas flow and maintained at that temperature for 14 hours. The H/C and O/C values of the heat treated pitch were 0.51 and 0.005, respectively.

After the pulverization into grains, the pitch was molded into a plate and calcined at 600° C. in the same way as in EXAMPLE 3.

However, the expansion of the plate resulted in this case because the H/C value was too high.

COMPARATIVE EXAMPLE 6

The same mesophase pitch as in EXAMPLE 3, that is, AR-I, was used in this Example. It was heated to 450° C. at a rate of 300° C./h in nitrogen gas flow and maintained at that temperature for 30 minutes. A small amount of air was blown into the heating atmosphere during this heat treatment.

The heat treated pitch had a H/C of 0.36 and an O/C of 0.02. The plate derived from the pitch was calcined in the same way as in EXAMPLE 3. A high performance carbon product could not be obtained as shown in Table 3 because the O/C value of the pitch thus heat treated was too high.

TABLE 3

| | Calcining temperature (°C.) | Bulk density (g/cm³) | Compressive strength (kgf/mm²) | Flexural strength (kgf/mm²) |
| --- | --- | --- | --- | --- |
| EXAMPLE 3 | 600 | 1.35 | 15.2 | 7.7 |
| | 1300 | 1.89 | 30.9 | 15.0 |
| | 1900 | 1.98 | 25.5 | 13.2 |
| EXAMPLE 4 | 600 | 1.35 | 15.1 | 7.2 |

TABLE 3-continued

|  | Calcining temperature (°C.) | Bulk density (g/cm³) | Compressive strength (kgf/mm²) | Flexural strength (kgf/mm²) |
| --- | --- | --- | --- | --- |
|  | 1300 | 1.88 | 28.5 | 14.0 |
|  | 1900 | 1.97 | 24.1 | 12.7 |
| COMPARATIVE EXAMPLE 4 | 600 | 1.08 | 4.4 | 2.0 |
|  | 1300 | 1.37 | 1.8 | 0.5 |
|  | 1900 | 1.40 | 0.9 | 0.1 |
| COMPARATIVE EXAMPLE 5 | 600 | unmeasurable | unmeasurable | unmeasurable |
|  | 1300 | unmeasurable | unmeasurable | unmeasurable |
|  | 1900 | unmeasurable | unmeasurable | unmeasurable |
| COMPARATIVE EXAMPLE 6 | 600 | 1.21 | 7.4 | 3.0 |
|  | 1300 | 1.68 | 8.2 | 3.3 |
|  | 1900 | 1.72 | 5.2 | 2.1 |

What is claimed is:

1. Self-adhesive carbonaceous grains having a ratio of hydrogen atoms to carbon atoms (H/C) within the range of from 0.35 to 0.48, and a ratio of oxygen atoms to carbon atoms (O/C) of less than 0.01, which grains are made by a process of heating a mesophase pitch in a range of from 470° C. to 550° C. in a non-oxidizing atmosphere, wherein the mesophase pitch has a softening point of higher than 170° C., an optical anisotropy of at least 80%, and a carbon yield of the mesophase pitch of at least 70% by weight when the mesophase pitch is heated to a temperature of about 600° C. in an inert gas atmosphere and then maintained at that temperature for 2 hours.

2. Self-adhesive carbonaceous grains according to claim 1, wherein the mesophase pitch has an optical anisotropy of almost 100%.

3. Self-adhesive carbonaceous grains according to claim 1, wherein the mesophase pitch has a carbon yield of at least 80% by weight when the pitch is heated to a temperature of about 600° C. an inert gas atmosphere and then maintained at that temperature for 2 hours.

4. Self-adhesive carbonaceous grains according to claim 1, wherein the mesophase pitch is produced by polymerizing condensed polycyclic aromatic hydrocarbons in the presence of $HF/BF_3$.

5. A process for producing carbon artifacts comprising the steps of:

heating a mesophase pitch possessing a softening point of higher than 170° C., an optical anisotropy of at least 80%, and a carbon yield of the mesophase pitch of at least 70% by weight when the mesophase pitch is heated to a temperature of about 600° C. in an inert gas atmosphere and then maintained at that temperature for 2 hours, wherein said heating of the mesophase pitch is carried out at a temperature in the range of from 470° C. to 550° C. in a non-oxidizing atmosphere, to obtain self-adhesive carbonaceous grains having a ratio of hydrogen atoms to carbon atoms (H/C) within the range of from 0.35 to 0.48, and a ratio of oxygen atoms to carbon atoms (O/C) of less than 0.01;

molding the self carbonaceous grains;

and calcining the molded carbonaceous grains in a non-oxidizing atmosphere in a range of from 600° C. to 1900° C., to obtain the carbon artifacts.

6. Carbon artifacts having a bulk density of about 1.35 to 1.98 (g/cm³), a compressive strength of about 15.1 to 30.9 (kgf/mm²) and a flexual strength of about 7.2 to 15.0 (kgf/mm²) which are produced by a process comprising the steps of:

heating a mesophase pitch possessing a softening point of higher than 170° C., an optical anisotropy of at least 80%, and a carbon yield of the mesophase pitch of at least 70% by weight, when the mesophase pitch is heated to a temperature of about 600° C. in an inert gas atmosphere and then maintained at that temperature for 2 hours, wherein said heating of the mesophase pitch is carried out in a temperature range of from 470° to 550° C. in a non-oxidizing atmosphere, to obtain self-adhesive carbonaceous grains having a ratio of hydrogen atoms to carbon atoms (H/C) within the range of from 0.35 to 0.48, and a ratio of oxygen atoms to carbon atoms (O/C) of less than 0.01;

molding the self carbonaceous grains;

and calcining the molded carbonaceous grains in a non-oxidizing atmosphere in a range of from 600° C. to 1900° C., to obtain the carbon artifacts.

7. Carbon artifacts according to claim 6, wherein the molded carbonaceous grains are calcined in a non-oxidizing atmosphere and then subjected to graphitization at a graphitization temperature.

8. A process for producing carbon artifacts according to claim 5, wherein the molded carbonaceous grains are calcined in a non-oxidizing atmosphere and then subjected to graphitization at a graphitization temperature.

* * * * *

UNITED STATES PATENT AND TRADEMARK OFFICE
CERTIFICATE OF CORRECTION

PATENT NO. : 5,547,654
DATED : September 6, 1994
INVENTOR(S) : Isao MOCHIDA et al.

It is certified that error appears in the above-identified patent and that said Letters Patent is hereby corrected as shown below:

On the cover page, under "United States Patent [19]", change "Machida et al." to --Mochida et al.--; and on the cover page, next to "[75] Inventors: Isao", change "Machida" to --Mochida--.

Signed and Sealed this

Seventeenth Day of December, 1996

Attest:

BRUCE LEHMAN

Attesting Officer

Commissioner of Patents and Trademarks